United States Patent [19]

Postma

[11] 4,425,593
[45] Jan. 10, 1984

[54] MAGNETORESISTIVE HEAD

[75] Inventor: Lambertus Postma, Eindhoven, Netherlands

[73] Assignee: U.S. Philips Corporation, New York, N.Y.

[21] Appl. No.: 230,846

[22] Filed: Feb. 2, 1981

Related U.S. Application Data

[63] Continuation of Ser. No. 31,236, Apr. 18, 1979.

[30] Foreign Application Priority Data

Feb. 28, 1979 [NL] Netherlands .......................... 7901578

[51] Int. Cl.³ .............................................. G11B 5/30
[52] U.S. Cl. .................................................. 360/113
[58] Field of Search ......................................... 360/113

[56] References Cited

U.S. PATENT DOCUMENTS

| | | | |
|---|---|---|---|
| 3,921,217 | 11/1975 | Thompson | 360/113 |
| 4,052,748 | 10/1977 | Kuijk | 360/113 |
| 4,150,408 | 4/1979 | Koel et al. | 360/113 |
| 4,321,640 | 3/1982 | Van Gestel | 360/113 |

*Primary Examiner*—Robert S. Tupper
*Attorney, Agent, or Firm*—Joseph P. Abate

[57] ABSTRACT

A magnetic head having an elongate magnetoresistive element bearing a pattern of equipotential strips extending obliquely to its longitudinal axis for adjusting a suitable workpoint. With its edges extending parallel to the longitudinal axis, the element bears on components of magnetically permeable material one of which, in operation, is in direct flux coupling with a magnetic recording medium and the other of which is in flux coupling with the recording medium via a further element of magnetically permeable material which may be ferrite.

3 Claims, 5 Drawing Figures

MAGNETORESISTIVE HEAD

This is a continuation of application Ser. No. 31,236, filed Apr. 18, 1979.

BACKGROUND OF THE INVENTION

The invention relates to a magnetic head for detecting information-representing magnetic fields on a magnetic recording medium movable relatively with respect to the magnetic head. The head is of a type comprising an elongate magnetoresistive element which at two oppositely located ends had contacts for the connection to a source of measuring current. The element has a magnetic anisotropy and the easy direction magnetization is parallel to the longitudinal axis of the element. The element comprises at least one electrically readily conductive strip which is provided obliquely on a surface of the element at an angle of at least 30° and at most 60° with the longitudinal axis of the element.

The invention relates to magnetic reading heads destined in particular, but not exclusively, for detecting magnetic fields in magnetic recording media, for example, magnetic tapes or disks.

A magnetic head of the kind mentioned in the preamble is known from Philips Technical Review 37, pp. 42–50, 1977, No. 2/3. In the known head, one or more oblique conductive strips are provided on one of the surfaces of the magnetoresistive element, preferably at an angle of 45° with the longitudinal axis of the element. These strips serve as equipotential strips so that the direction of the current in the element which is at right angles to the equipotential strips encloses an angle with the easy direction of magnetization, preferably an angle of 45°. In this manner the operation of the known magnetic head is linearized: the relative resistance variation of the magnetoresistive element ($\Delta R/R$) as a function of the transversal external magnetic field (H), which is presented by a magnetic recording medium to be read is then represented as a matter of fact by a substantially linear odd function.

Although the known head has the advantage of a simple linearization, it has the disadvantage, however, that a certain deviation from the linear characteristic occurs as a result of the condition that near the edges of the magnetoresistive element extending in the longitudinal direction the angle at which the current flows with respect to the longitudinal axis varies until the angle becomes 0° at the boundary of the element. The result of this is that in fact the playback characteristic of the known magnetic head is not represented by an odd function but by the sum of an odd function and an even function.

Copending U.S. application Ser. No. 31,259 filed Apr. 18, 1979 relates to magnetic head of the above type which does not exhibit this disadvantage. To that end it includes two components of a magnetically permeable material (so called flux conduxtors) positioned in line with each other, between which components a gap is present, the magnetoresistive element spanning said gap, the facing ends of the components of magnetically permeable material covering the edge zone of the magnetoresistive element extending parallel to the longitudinal axis of the element, the end of the first one of the components of magnetically permeable material remote from the magnetoresistive element being adapted to cooperate with a magnetic recording medium.

In this manner it is ensured that the edge zones of the magnetoresistive element extending parallel to the longitudinal axis are shortcircuited magnetically by the magnetically permeable components, Since now substantially no magnetic flux originating from the recording medium flows through the edge zones, the contribution of their resistance variation to the overall resistance variation of the element is very small and hence also the non-linearity caused by the edge zones so that the playback characteristic has a much more linear variation than that of the known magnetic head.

A geometric arrangement of a magnetoresistive element as a bridge of a gap between two magnetically permeable elements is known per se from U.S. Pat. No. 3,921,217. However, the magnetoresistive element disclosed in the latter patent is not of the kind to which the invention relates, but of a magnetically biased type in which it is necessary to apply a permanent magnetic field for the lineariza of the playback characteristic of the magnetoresistive element so as to displace the workpoint to a linear area of the curve resistance/magnetic field. However, in a magnetic head having such a magnetoresistive element the problem for which the invention provides a solution does not occur.

Although the distortion of a current-biased magnetoresistive element with magnetically short-circuited edge zones disclosed in the above copending application is already considerably less than of a similar element the edge zones of which are not magnetically shortcircuited, some distortion may nevertheless remain. This appears to be due to the condition that the magnetoresistive head according to the invention is supersensitive to long-wavelength signals.

SUMMARY OF THE INVENTION

This disadvantage is avoided by the magnetoresistive head according to the invention which further includes a comparatively thick element of a magnetic ferrite material which is positioned in substantially parallel relationship to the two components of magnetically permeable material, the element of magnetic ferrite material, at a first termination, is coupled magnetically to the second one of the components of magnetically permeable material and, at a second termination opposite the first, is disposed proximate to the magnetic recording medium movable relatively with respect to the head.

As a result of the coupling of the magnetic ferrite element to that one of the flux conductors which is remote from the recording medium, the magnetic flux which has been "sucked up" by that flux conductor which is near the recording medium can be returned to the recording medium, which increases the sensitivity of the element to shortwave length signals. As a result of this, the overall sensitivity can be reduced, so that the element is then no longer supersensitive to long wavelengths.

If a magnetic ferrite material is not chosen for the comparatively thick element, a good result is not always achieved. The use of comparatively small measuring currents (order 10 mA) has the advantage that the (temperature) noise is smaller than in the case in which comparatively large measuring currents are used. It has also been found that the choice of alloys of the nickel-iron type for the comparatively thick element results in the fact that the gain obtained as regards distortion is partially lost. This is ascribed to the occurrence in such an element of one or a few localized domain walls. These domain walls can influence the magnetization of the magnetoresistive element in such a manner that it is no longer related to the direction of the (weak) measuring current.

If, however, the comparatively thick element consists of a magnetic ferrite, so many arbitrarily oriented domain walls will be present in the element that they have no net influence on the magnetoresistive element, so that when using an element of ferrite, a small measuring current is sufficient to maintain the direction of the magnetization in a desired direction.

BRIEF DESCRIPTION OF THE DRAWINGS

The invention will be described in greater detail, by way of example, with reference to the accompanying drawing, in which.

DESCRIPTION OF THE PREFERRED EMBODIMENT

Figure 1:
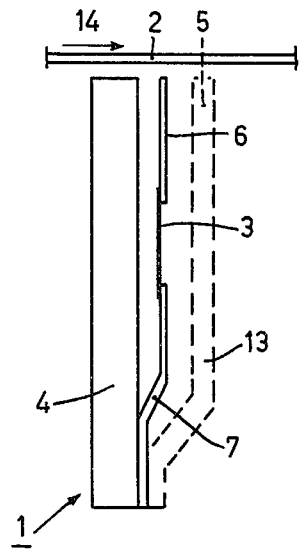
FIG. 1 is a cross-sectional view.

FIG. 1 shows a magnetic head 1 which serves to detect magnetic fields originating from a magnetic recording medium 2 moving past the head 1 in the direction of the arrow 14. The detection of said fields occurs by measuring the relative resistance variation of a magnetoresistive element 3 to which magnetic flux is supplied via a magnetically permeable component 6 (so-called flux conductor) on (or below) which it engages with one edge, while the magnetic flux is returned to the recording medium via a magnetically permeable component 7 on which it engages with the other edge, and a magnetic element 4 which is coupled thereto and preferably consists of ferrite.

If desired, the magnetic head according to the invention may comprise a ferrite shield 5 which together with the element 4 ensures a complete screening of the magnetoresistive element 3 from long-wave information. The components 6 and 7 are of a high magnetic permeability material, for example, a nickel-iron alloy, and are accommodated so that the component 6 faces the recording medium 2 and the component 7 is coupled to the magnetic shields 4 and 5.

Figure 2:
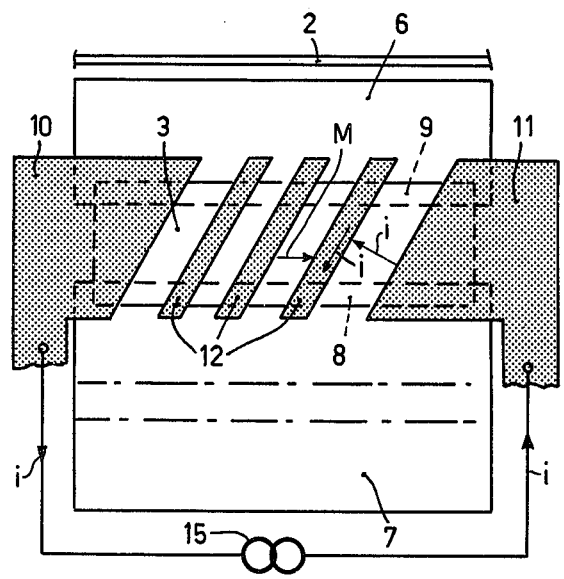
FIG. 2 is a longitudinal sectional view of a magnetic head having a magnetoresistive element which is provided with oblique equipotential strips and elements conducting magnetic flux.

As shown in FIG. 2, the components 6 and 7 may be longer than the magnetoresistive element 3 and they cover edge zones 8 and 9 on one side thereof, while on the other side contacts 10 and 11 which are connected to a source of measuring current 15, and electrically readily conductive strips 12 which are at an angle between 30° and 60°, preferably 45°, with the longitudinal axis of the element 3, are provided. These strips force the current i to flow between the strips obliquely with respect to the longitudinal axis, so that the element 3 as it were has an electric bias. The current i in the strips flows in the longitudinal direction of the strips and as a result of this produces in the magnetoresistive material a small magnetic field which is capable of maintaining the magnetization M in the desired direction.

Figure 3:
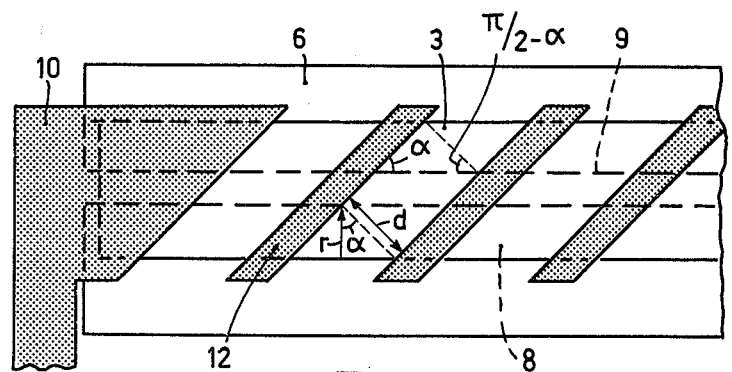
FIG. 3 shows a part of FIG. 2 in greater detail.

The covering zones preferably extend entirely over the regions of the magnetoresistive element 3 in which the direction of the current lines is not uniform. FIG. 3 shows in more detail the width r of one of said regions, in which r can be derived in the following manner;

When, for example, d is the intermediate space between two conductive equipotential strips and $\alpha$ is the slope of these same strips with respect to the longitudinal direction of the magnetoresistive element, a simple trigonometric calculation gives:

$$r = d.\cos(\alpha).$$

Figure 4:
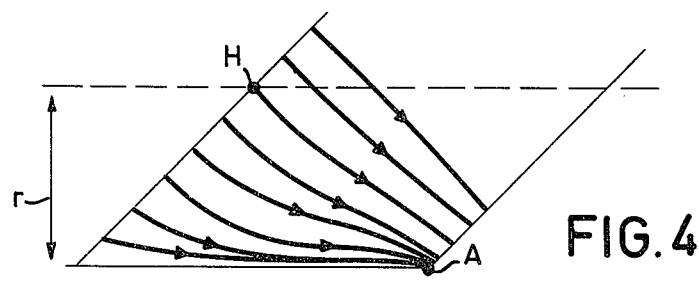
FIG. 4 shows diagrammatically the variation of the current lines at the edge of a magnetoresistive element on which oblique equipotential strips have been provided.

The covering width should be at least equally as large as the edge zone of the magnetoresistive element where the current lines do not extend uniformly, as is shown in FIG. 4. The current lines are tracks which extend at right angles to the equipotential strips but the discontinuity at the edge interferes with the uniform variation of these lines over a given distance. This distance is obtained by projecting a point A which forms the base of a first equipotential strip, on an adjacent equipotential strip, which gives a point H.

In the zone which lies between a line through H and the edge the current lines show a varying angle with the longitudinal axis of the element. (The easy direction of magnetization of the magnetoresistive element is parallel to the longitudinal axis).

In the magnetic head of the invention the edge zones are made inactive as it were, so that it is possible to very closely approach the ideal response characteristic.

Additional advantages resulting from the use of the magnetic flux conductors 6 and 7 are that the magnetoresistive element does not experience any mechanical detrition because it is not placed in direct contact with the moving magnetic recording medium, while temperature fluctuations influencing the resistance and hence causing noise occur to a smaller extent.

Moreover, the width of the track which is read is better defined as a result of the use of the magnetic flux conductor 6 having a width equal to the track width. The thickness of 6 is considerably larger than that of 3.

Figure 5:
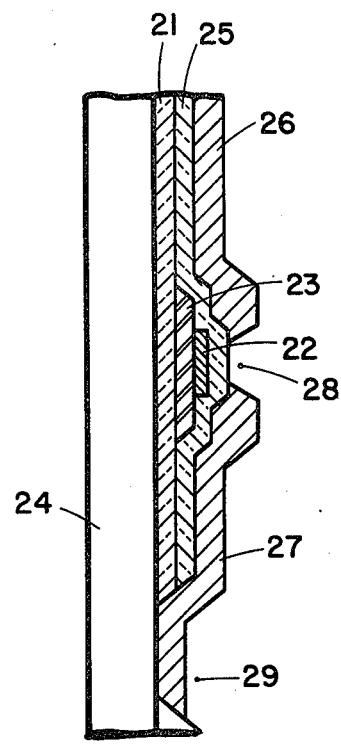
FIG. 5 shows another embodiment of the invention diagrammatically.

The magnetic head of the invention is well suited to be made in thin-film technology with the use of suitable masks. As shown in FIG. 5 one embodiment includes the following multilayer structure:

a ferrite substrate 24 or a substrate carrying a ferrite top layer on which are provided successively:

a first insulation layer of quartz 21, a magnetoresistive layer 23 one or more strips 22 of electrically conductive material extending obliquely to a side of the magnetoresistive layer, a second insulation layer of quartz 25, a first layer 26 of nickel-iron and a second layer 27 also of nickel-iron by an intermediate space 28 which exposes the central portion of the magnetoresistive layer, one of the two parts contacting the ferrite via a through hole 29 in the first insulation layer 21.

It will be apparent that many variations are possible to those skilled in the art without departing from the scope of the invention, for example the sequence of magnetoresistive layer with oblique strips and nickel-iron layer may be reversed.

What is claimed is:

1. A magnetic head for detecting information-representing magnetic fields on a magnetic recording medium movable relatively with respect to the magnetic head, the head comprising an elongate magnetoresistive element which is current biased provided on two oppositely located ends with contacts for connection to a source of measuring current, said element having a magnetic anisotropy and having the easy direction of magnetization disposed in parallel relation to the longitudinal axis of the element, the magnetic head further comprising at least one electrically readily conductive strip which is provided obliquely on a surface of the element at a first angle of at least 30° and at most 60° with the longitudinal axis of said element, the magnetic head also including two components of magnetically permeable material of a nickel-iron alloy disposed in generally coplanar relation with a gap disposed therebetween, said magnetoresistive element spanning said gap, facing ends of the components of magnetically permeable material covering edge zones of the magnetoresistive element extending parallel to the longitudinal axis of said element, said readily conductive strip, said components of magnetically permeable material, and said gap with said magnetoresistive element forming a substantially closed path for magnetic flux, one end of the first one of said components of magnetically permeable material remote from the magnetoresistive element co-operating with the magnetic recording medium, the magnetic head further including a magnetic ferrite element which is positioned in substantially parallel spaced relationship to the two components of magnetically permeable material and which, at a first termination, is coupled magnetically to the second one of the components of magnetically permeable material and, at a second termination opposite said first termination, is disposed proximate to the magnetic recording medium movable relatively with respect to the head, said magnetic ferrite material being substantially thicker than said two components between which a gap is present and also substantially thicker than said magnetoresistive element, said one end of the first one of said components of magnetically permeable material being a magnetic medium scanning portion of said head, and the edge zones of the magnetoresistive element covered by the ends of the components of magnetically permeable material corresponding substantially with the areas of the element in which the direction of the current lines is not uniform when a measuring current flows through the element.

2. A magnetic head as claimed in claim 1 which comprises a multilayer structure wherein said magnetic ferrite element comprises a ferrite substrate or a substrate carrying a top-layer of ferrite on which are provided successively:
a first insulation layer of quartz
said magnetoresistive element comprises a magnetoresistive layer
said at least one conductive strip comprises one or more strips of electrically conductive material extending obliquely to a side of the magnetoresistive layer,
a second insulation layer of quartz, and
said two components of magnetically permeable material comprise a layer of nickel-iron in two parts separated by an intermediate space which exposes the central portion of the magnetoresistive layer, one of the two parts contacting the ferrite via a through hole in the first insulation layer.

3. A magnetic head as claimed in claim 1, wherein the magnetic head includes at least two electrically conductive strips provided on said surface of said magnetoresistive element, and said two components of magnetically permeable material overlap said magnetoresistive element along a strip-shaped region having a width equal to the distance between two of said conductive strips times the cosine of said first angle.

* * * * *